(12) United States Patent
Costantino et al.

(10) Patent No.: US 7,191,926 B1
(45) Date of Patent: Mar. 20, 2007

(54) CARRY CASE FOR A PORTABLE COMPUTER

(76) Inventors: Cory Costantino, 13 Pauline St., Winthrop, MA (US) 02152; Jeremiah Driscoll, III, 45 Hillside Ave., Winthrop, MA (US) 02152

( * ) Notice: Subject to any disclaimer, the term of this patent is extended or adjusted under 35 U.S.C. 154(b) by 581 days.

(21) Appl. No.: 10/774,172

(22) Filed: Feb. 7, 2004

Related U.S. Application Data (60) Provisional application No. 60/319,930, filed on Feb. 7, 2003.

(51) Int. Cl.
*A45F 3/02* (2006.01)

(52) U.S. Cl. .............. 224/605; 224/616; 224/930; 206/320; 190/102

(58) Field of Classification Search ......... 224/616, 224/576, 623, 586, 638, 639, 242, 245, 246, 224/930; 206/320, 305; 190/102, 900
See application file for complete search history.

(56) References Cited

U.S. PATENT DOCUMENTS

| | | | |
|---|---|---|---|
| D116,977 S | 10/1939 | Bellau | |
| D276,953 S | 1/1985 | Weinreb | |
| 5,105,338 A | 4/1992 | Held | |
| D358,935 S | 6/1995 | Chang et al. | |
| 5,524,754 A | 6/1996 | Hollingsworth | |
| 5,607,054 A | 3/1997 | Hollingsworth | |
| 5,724,225 A | 3/1998 | Hrusoff et al. | |
| 5,775,497 A | 7/1998 | Krulik | |
| 5,881,850 A * | 3/1999 | Murdoch | 190/110 |
| 5,887,723 A * | 3/1999 | Myles et al. | 206/760 |
| 5,887,777 A | 3/1999 | Myles et al. | |
| 5,931,297 A | 8/1999 | Weill et al. | |
| 5,938,096 A | 8/1999 | Sauer et al. | |
| 5,960,952 A * | 10/1999 | Chen | 206/320 |
| 5,971,148 A | 10/1999 | Jackson | |
| 6,105,766 A * | 8/2000 | Chuang | 206/320 |
| 6,109,434 A | 8/2000 | Howard, Jr. | |
| 6,145,661 A | 11/2000 | Jung | |
| 6,149,001 A | 11/2000 | Akins | |
| D441,190 S | 5/2001 | Eskandry | |
| 6,237,766 B1 | 5/2001 | Hollingsworth | |
| 6,305,652 B1 * | 10/2001 | Borke et al. | 248/174 |
| 6,349,825 B1 | 2/2002 | Swinger et al. | |
| 6,390,297 B1 | 5/2002 | Hollingsworth | |
| 6,763,942 B1 * | 7/2004 | Yeh | 206/320 |
| 7,036,642 B2 * | 5/2006 | Hoberman et al. | 190/36 |
| 2003/0029755 A1* | 2/2003 | Ho | 206/320 |

* cited by examiner

*Primary Examiner*—Nathan J. Newhouse
*Assistant Examiner*—Corey N. Skurdal
(74) *Attorney, Agent, or Firm*—John P. McGonagle (57) ABSTRACT

A carry case applied to a portable computer like a wrap. Thin straps of stretchable material hook around the front corners of a computer base section and the upper corners of a computer screen section. The case is comprised of a base section holding the computer base portion and a screen section holding the computer screen portion. An additional flap of material extends from the rear of the case base section and flips over and onto the exterior of the case screen section where it is attached with releasable fasteners. The carry case has a shoulder strap, handle and built-in typing stand.

13 Claims, 11 Drawing Sheets

CARRY CASE FOR A PORTABLE COMPUTER

CROSS-REFERENCE TO RELATED APPLICATIONS

Applicants claim the priority benefits of U.S. Provisional Patent Application No. 60/319,930, filed Feb. 7, 2003.

BACKGROUND OF THE INVENTION

This invention relates to carry cases, and in particular, to a carry case for a portable computer which can be used without removal from the case.

Due to the increased popularity of the "notebook" or laptop computer, computer companies such as IBM, Hewlett Packard, Compaq, Toshiba, etc. have flooded the market with laptops of all varieties and price ranges. People of all ages and profession are now utilizing these compact, lightweight computers on a daily basis and in most cases, in replacement of traditional "desk top" systems. While the laptop computer in general decreases in price and shrinks in size over time, the products are still expensive, potentially pricing in the thousands of dollars. This portability combined with a fairly expensive piece of sensitive equipment inherently produces a certain amount of "loss of investment" risk based on damage. The prior art provides a wide range of carry cases for notebook computers. Prior art bags come in all shapes, sizes and colors. They provide you with varying room for accessories, shoulder straps, detachable pouches, or in a basic form, just a padded slipcover with a handle.

The main function of prior art carry bags is to provide ease of transport for your portable system, while also providing damage protection. Unfortunately, these bags have no ability to provide protection to the laptop while it is in use. Even with prior art the briefcase-like, flip open bags, it is difficult or impossible to fully utilize the computer while it is sitting in the case; i.e. the power supply is hard to plug-in, the disc drives have no room to open, the accessory ports are hard to access etc. This is a disadvantage to anyone who needs to move, with his or her laptop, over relatively short distances from one place to another within relatively short periods of time. For example, students with a few hours of classes, field technicians, or an at home office person, who want to go sit in another room at a moments notice. The time it would take to shut down the computer, successfully pack up the bag, move, then unpack and reboot it is too long. People would rather risk damage to their laptop than waste that time. Given that this type of situation is common, there is a need for a lightweight, protective carry case which will allow this type of mobility while retaining the full capability of the laptop.

In an attempt to solve these problems a number of hybrid products have been introduced to allow the carry case to open up and in some cases attach to the laptop in such a way as to mimic the motion of opening the computer. These newer products attempt to provide ease of use to the laptop including access to ports, drives, and ventilation areas. They also, depending on the target market, have varying degrees of physical storage capacity. It is within this realm of product that the current invention shall show novel improvements and configurations. Such a design and products will appear hereinafter.

SUMMARY OF THE INVENTION

Through a novel combination of features and construction techniques, the present invention distinguishes itself over prior art within this field. The present invention, as described herein, aims to provide protection to laptop computers during use and transport while improving many of the principle characteristics of prior art carry bags. Included in these characteristics are: ease of use, ease of manufacture, aesthetic flare, practicality, consumer comfort, and improved functionality.

The carry case of the present invention is applied to a portable computer like a wrap. Thin straps of material hook around the front corners of the computer base section, then flexible panels wrap around the bottom, up the back panel and back of the screen, then hooking around the top corners of the screen section. This wrap design includes at least two main sections; a base section and a screen section. This corresponds to the basic design of a portable laptop computer itself. The two aforementioned sections of the product are permanently linked together via a band of material that wraps fully around the left, front and right side of the two sections. The band of material is padded to protect the computer during transport and is split along its length by a zipper. The location of the zipper on the piece is justified towards the bottom section. The zipper stays parallel at all times with the long edge of this band, providing one smooth motion for opening. When the zipper opens, allowing the use of the laptop computer, the sides and front of the computer's base section are effectively free of obstruction from that padded margin, with only a small amount of that margin and half of the zipper teeth possibly touching any disc or cables that may enter the computer. The screen and base sections of the present invention is permanently attached at the end points of the zipper where attachment points for a shoulder strap reside. The zipper itself never actually becomes fully disengaged, meaning the user will never have to line up the zipper slide with an entry or exit point. In order to cover completely the rear of the computer, a flap of material extends from the rear of the bottom section and flip over and onto the exterior of the top section, being able to secure to the external surface of the top section upon closure using Velcro or a buckle design.

The present invention carry case is made from flexible material, such as leather, fabric, and some elastic. The main sections of the case may also have varying materials sewn in for stiffening plates such as on the bottom of the unit. The base section would also include a stiff, foldout stand design that will effectively tilt the computer forward, and provide a better ergonomic angle to the keyboard while in use.

The carry case is secured to the computer in a manner such that no material, hardware, or adhesive is permanently attached to the computer itself. The current invention has been designed to remain around the portable computer during transport or use. The method of attachment to the laptop itself would preferably be a diagonal elastic or fabric strap that would contain the corners of the unit and would provide stability in all directions. In an aim to provide a snug fit, these straps will be elastic or have an adjustment buckle to tighten them down on the computer. These straps will be thin enough to allow closure of the laptop. The nature of such a strapping system implies that the straps could block some portion of a port or drive on the sides and front of the computer. Because these straps will be easily adjustable or elastic, quick access to these potentially block ports will be made very easy. There will also be at least two other straps of adjustment between the rear of the top and bottom sections. The top or screen section will provide the straps while the base will provide an adjustable means of attachment such as a buckle or slide. This section of the invention corresponds to the rear panel of the computer, which contains many of the larger access ports. Because of this method of construction, the rear patch panel would then be almost entirely free of obstruction. Between the four corner straps and two rear straps, the computer can be strapped in an adjusted once and essentially left on the computer at all times, except during a maintenance or other non-usual situation.

When the computer is in use, the carry case presents itself as a protective shell concerning itself solely with the exterior surfaces, appearing to work in much the same way as a textbook cover.

In order to fully describe and provide understanding of all the advantages of the present invention, the following detailed drawings and descriptions thereof are presented. When referencing the following descriptions, it should be noted that certain terminology will be used to refer to the present invention. The terms "protective case", "carry case", or simply "case" will all refer to, in whole or in part, the present invention. It should also be noted that certain terminology will be used to refer to the portable computer for which the present invention applies. The terms "laptop", "portable computer", and "computer" will all refer to, in whole or in part, aforementioned portable computer.

DETAILED DESCRIPTION OF INVENTION

Referring to the drawings in detail wherein like elements are indicated by like numerals, there is shown a carry case 1 for a portable computer 2. The carry case 1 is comprised of base section 20 joined to a screen section 40, said base section having an optional typing stand 70 and a rear flap section 60.

In the example shown, the portable computer 2 is a laptop or notebook computer having a generally rectangular base portion 3 and a generally rectangular screen portion 10. The base portion 3 has a top 4 with a keyboard and various function keys, an opposite flat bottom 5, a front 6, a rear 7 with various connectors and input/output jacks, and two opposite sides 8 with various media slots and connectors. The screen portion 10 has a front 11 with a display area, rear 12, top edge 13, bottom edge 14 and two opposite sides 15. The case base section 20 holds the computer base portion 3, and the case screen section 40 holds the computer screen portion 10.

The case base section 20 is generally flat with a generally rectangular shape. The base section 20 has a top surface 21, an opposite bottom surface 22, a front edge 23, rear edge 24, and two opposite side edges 25, said base section front, rear and side edges form a base section periphery 26. The base section periphery 26 has a zipper fastener 27 attached thereto along the front and side edges 23, 25. The base section top surface 21 has two sets of stretchable straps 28 anchored to two parallel strips, a forward anchor strip 29 adjacent the base section front edge 23 and a rearward anchor strip 30 a predetermined distance toward the base section rear edge 24. The base section top surface 21 is adapted to receive a computer base portion bottom 5, with the computer base portion 3 having the same orientation on the case base section top surface 21. The base section straps 28 are fitted over the computer base portion top 4, from base portion front 6 to base portion sides 8. The differences in attachment points to the rearward anchor strip 29 by one set of straps 28 allows the case to hold computers of different sizes.

The case screen section 40 is generally flat with a generally rectangular shape. The screen section 40 has an external surface 41, an opposite interior surface 42, a front 43, a rear 44, and two opposite sides 45, said screen section front, rear and sides having a screen section periphery. The front 43 and opposite sides 45 have a flange 46 formed therein, said flange 46 projecting away from the interior surface 42 in planes perpendicular to the plane of the interior surface 42. The flange 46 terminates in a zipper fastener 47 adapted to engage the base section zipper fastener 27. The screen section interior surface 41 has two sets of stretchable straps 48 anchored to two parallel strips, a forward anchor strip 49 adjacent the screen section front 43 and a rearward anchor strip 50 a predetermined distance toward the screen section rear 44. The screen section interior surface 42 is adapted to receive a computer screen portion rear 12, with the computer screen portion 10 having the same orientation with the case screen section 40. The screen section straps 48 are fitted over the computer screen front 11, from screen portion top edge 13 to screen portion sides 15. The differences in attachment points to the forward anchor strip 49 by one set of straps 48 allows the case to hold computers of different sizes. The screen section external surface 41 may optionally have a pocket 56 with an opening formed adjacent to the screen section front 43. The pocket 56 may optionally have a fastener 57 to keep it closed.

By capturing the corners diagonally, the straps 28, 48 provide an efficient means of securely holding the computer base portion and screen portion to the case base section 20 and screen section 40 and providing horizontal and vertical stability.

The screen section flange 46 has an extension portion 51 at the rear of each opposite side 45. The case base section 20 and screen section 40 are fixedly attached to each other at the rear edge of the base side edges 25 and rear of the screen sides 45 at the flange extension portion 51. Each flange extension portion terminates in a D-ring 52. The zipper fasteners 27, 47 also terminate in the flange extension portions 51.

The screen section 40 has a generally rectangular open portion 53 formed at its rear 44 and extending from side 45 to side 45. The screen section 40 also has two adjustment straps 54 attached thereto adjacent the open portion 53, said straps being parallel to the sides 45. The base section top surface 21 has two buckles 31 attached thereto near to the base section rear edge 24. The screen section adjustment straps 54 are adapted to engage said base section buckles 31.

The base section rear edge 24 is joined to a flap section 60, said flap section having an exterior surface 61, an opposite interior surface 62, a free end 63, an attached end 64, and two opposite side 65. The flap section attached end 64 is joined to said base section rear edge 24. The flap section interior surface 62 has two elongated attachment strips 66 attached thereto, said attachment strips 66 having longitudinal axes parallel to the flap opposite sides 65. The screen section external surface 41 has two corresponding elongated attachment strips 55 attached thereto, said screen section attachment strips 55 and flap section attachment strips 66 adapted to being releasably joined. The flap section external surface 61 may have two or more pockets 67 with closure fasteners 68.

Figure 1:
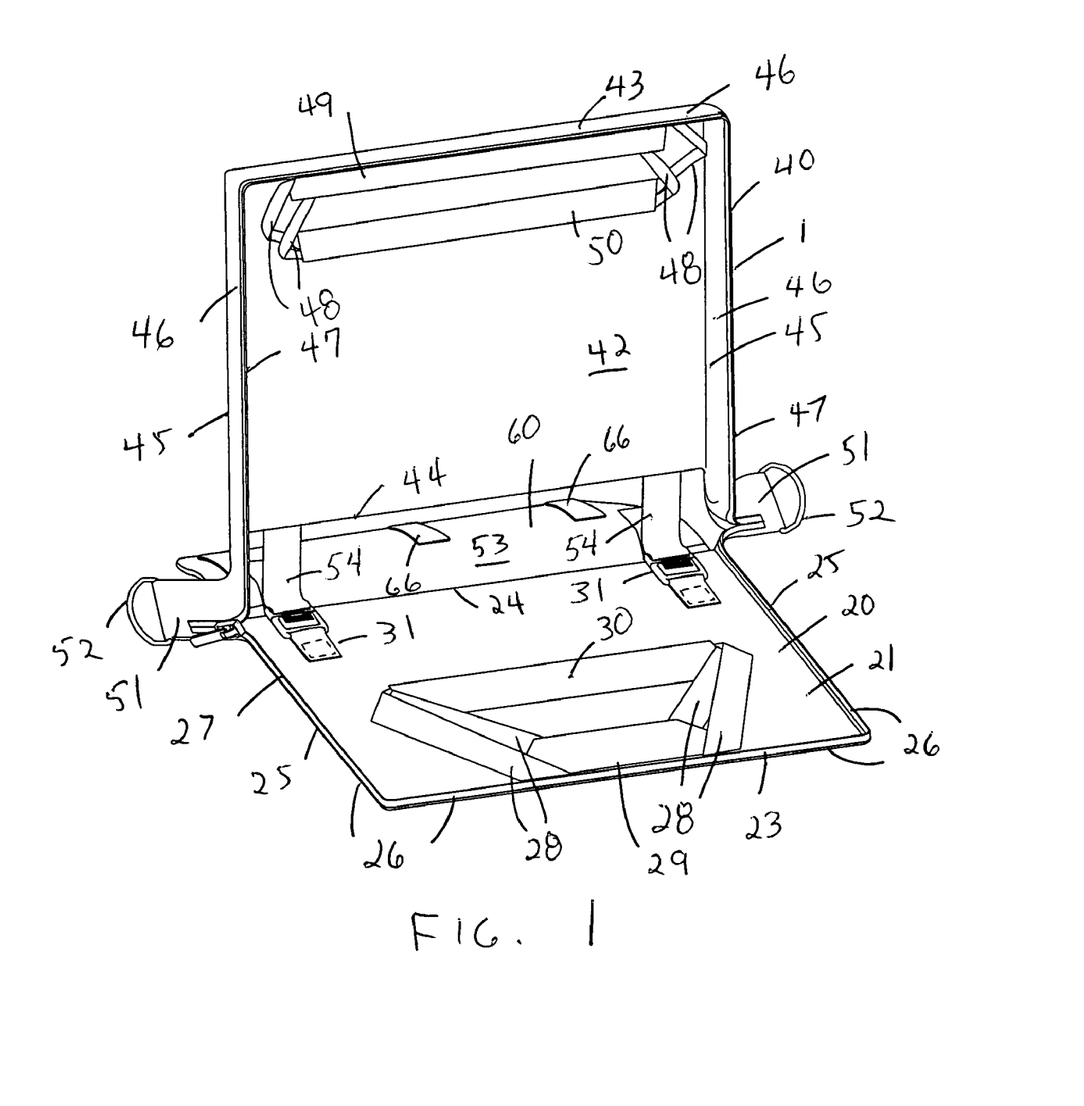
FIG. 1 is a front perspective of the invention carry case in an open state.
Figure 2:
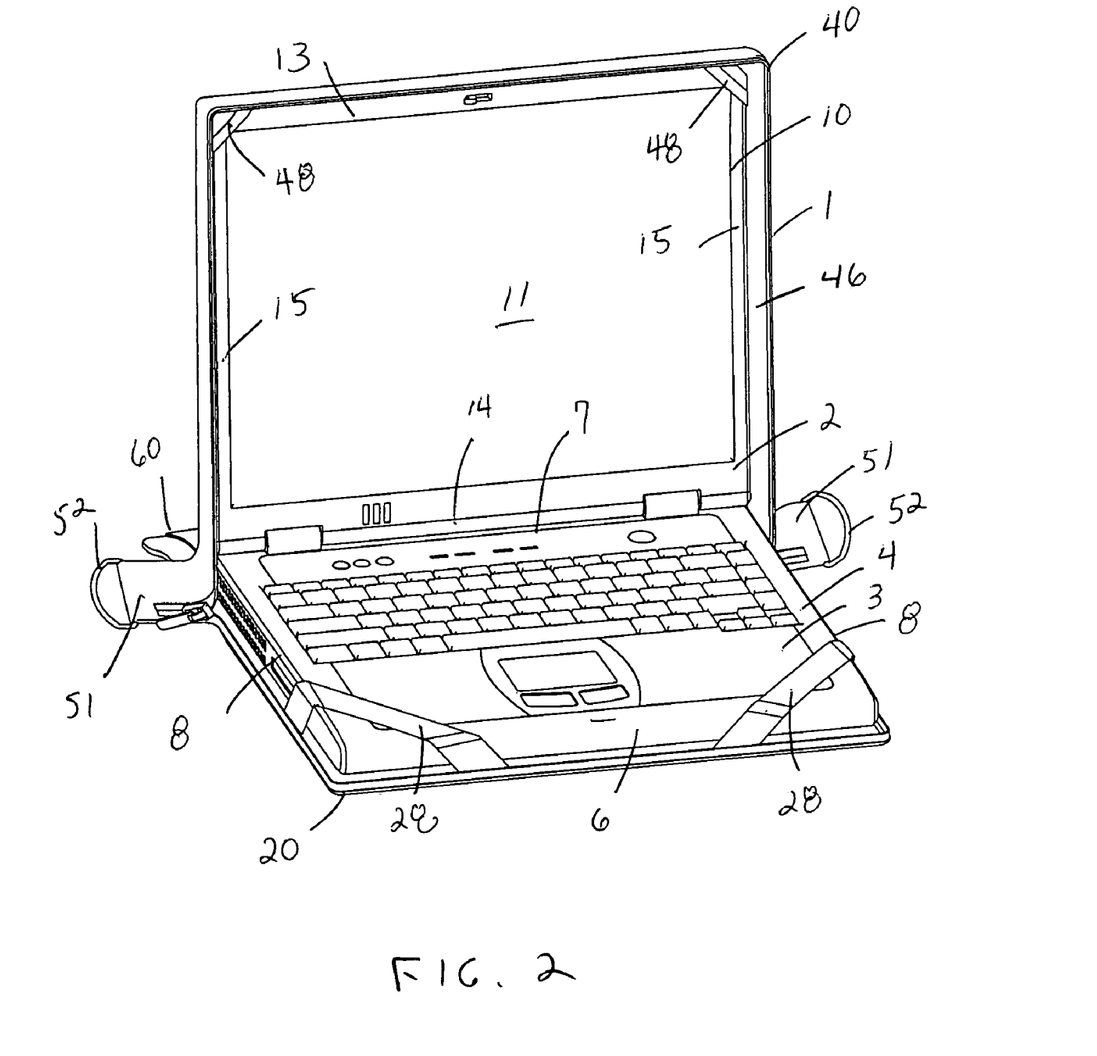
FIG. 2 is a front perspective view of the carry case of FIG. 1 with a portable computer contained therein.
Figure 3:
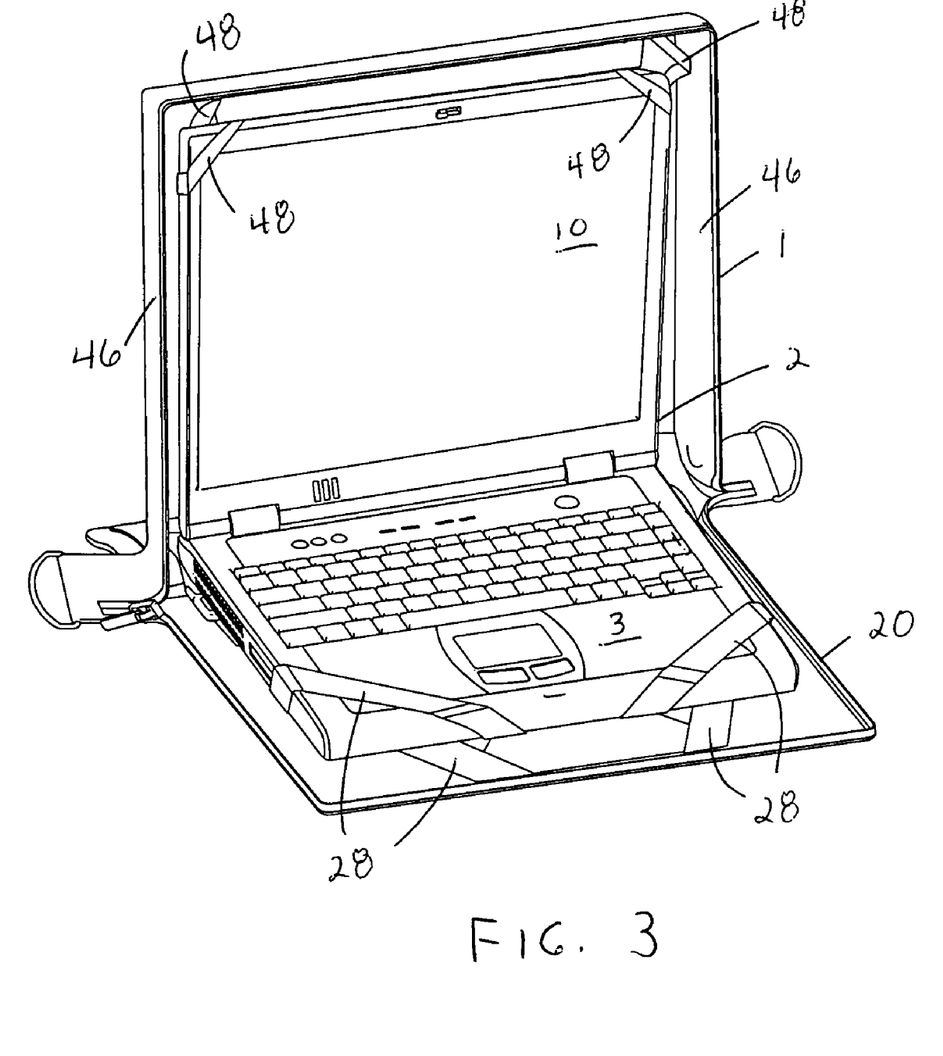
FIG. 3 is a front perspective view of the carry case of FIG. 1 with a smaller notebook computer contained therein.
Figure 4:
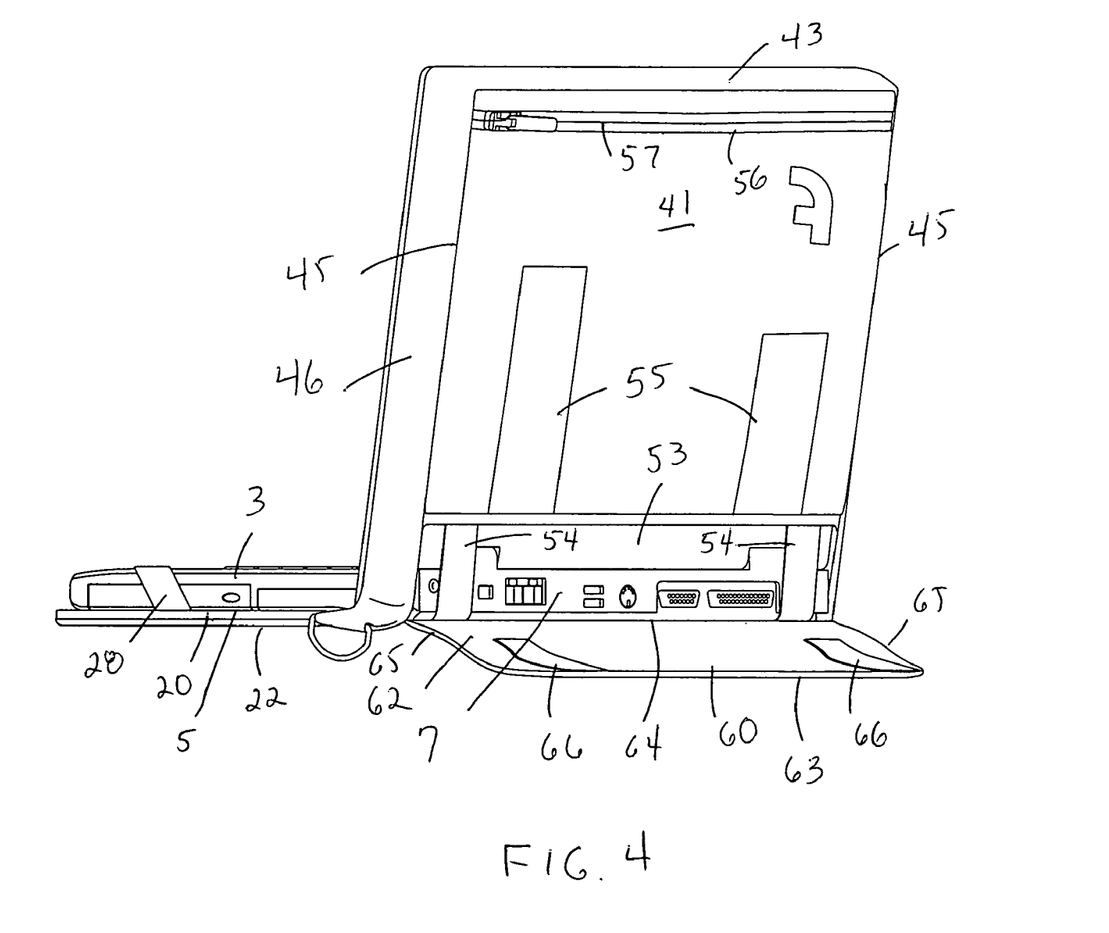
FIG. 4 is a rear view of the case and computer shown in FIG. 2.
Figure 5:
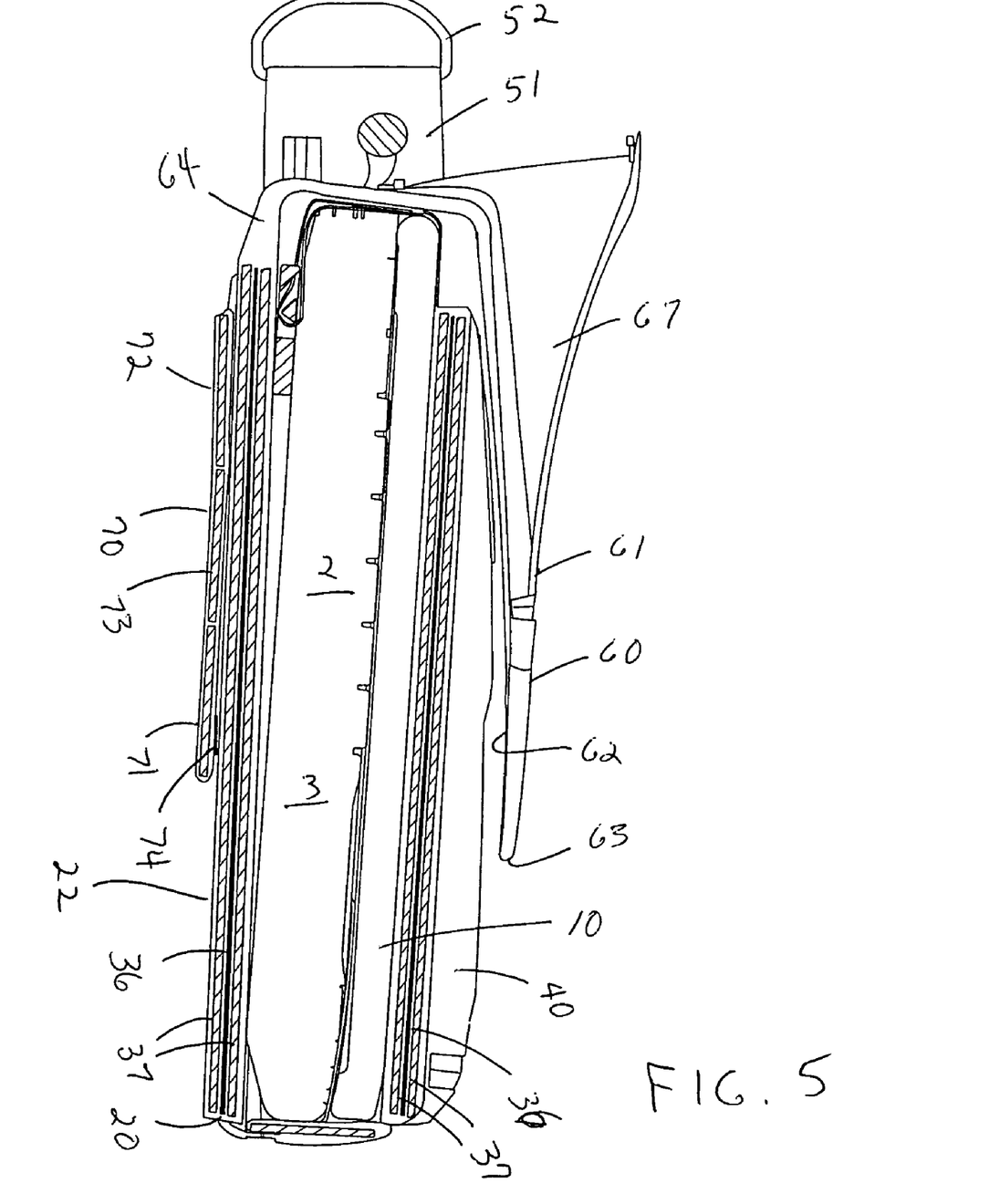
FIG. 5 is a cross sectional view of the carry case with computer in a closed state.
Figure 6:
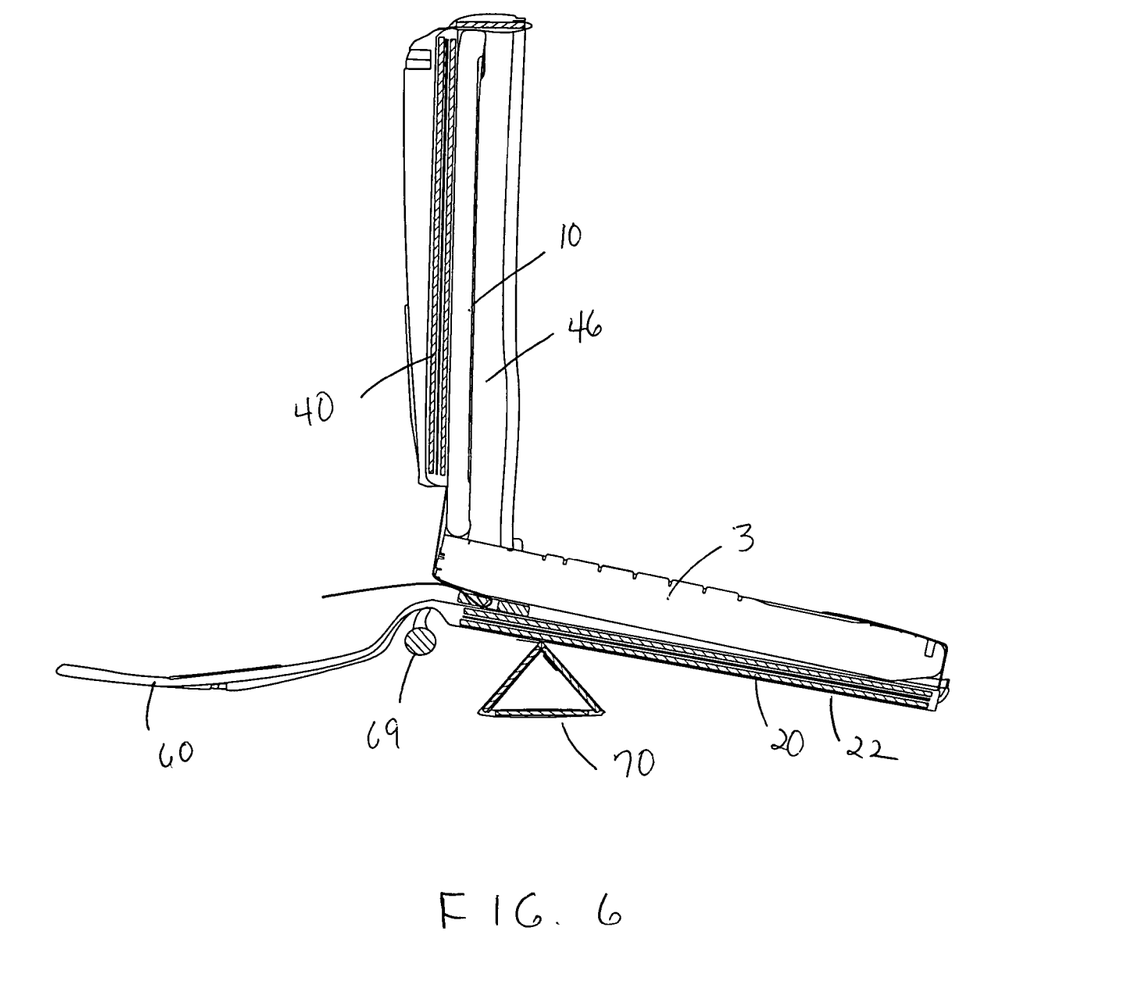
FIG. 6 is a cross sectional view of FIG. 2 with typing stand deployed.
Figure 7:
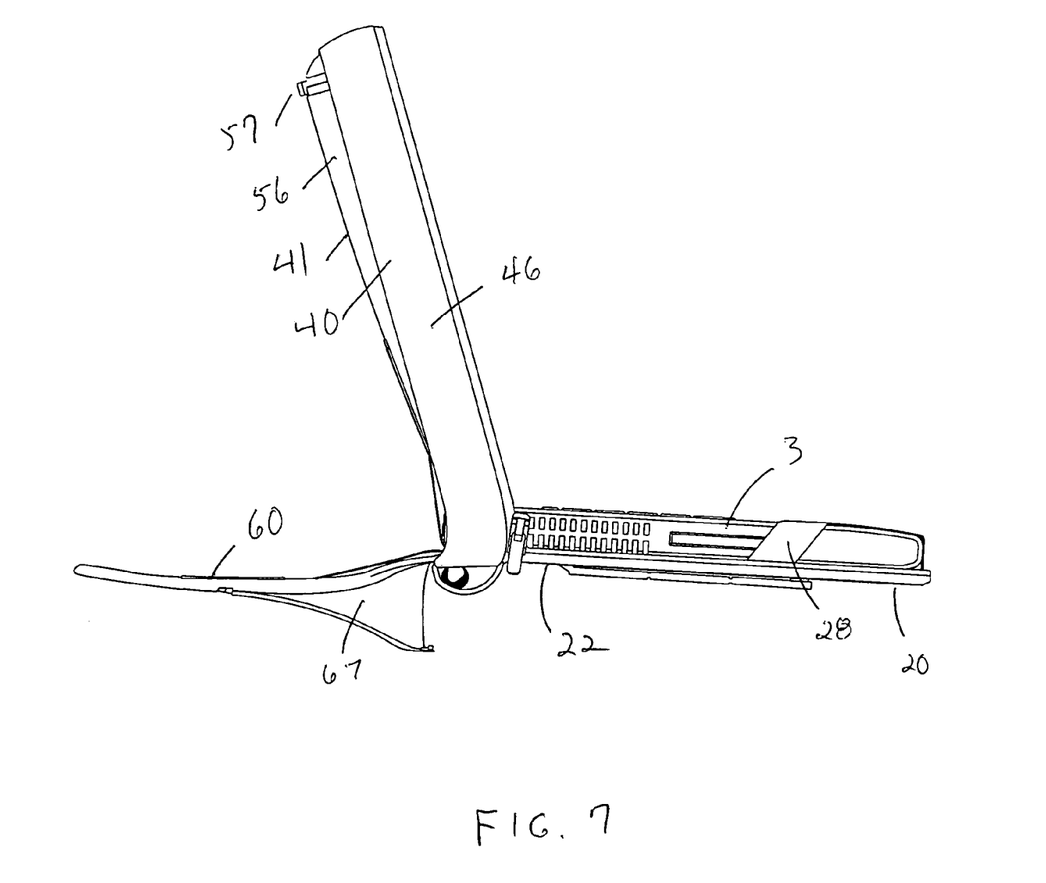
FIG. 7 is a side view of the case and computer of FIG. 2.
Figures 8, 9:
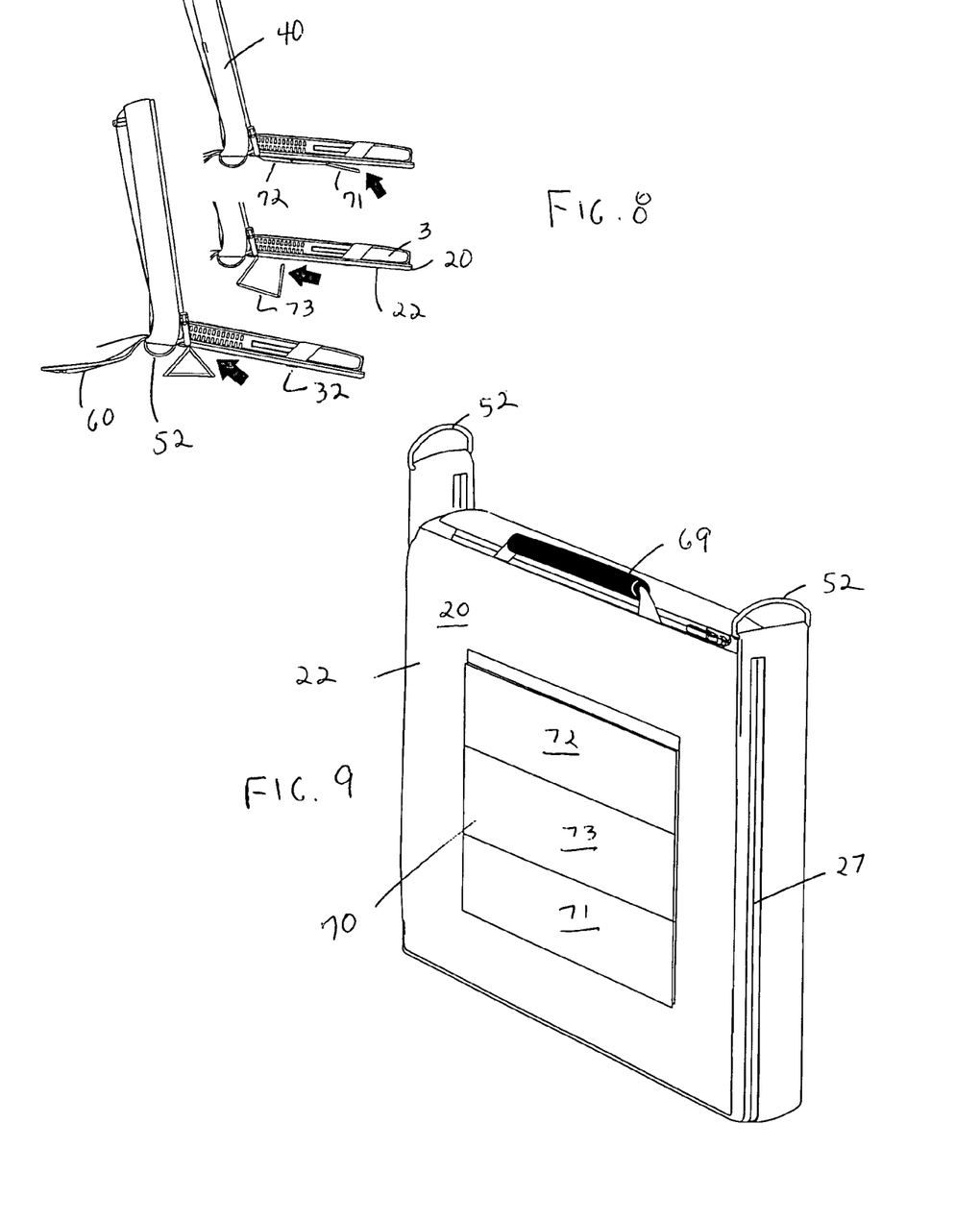
FIG. 8 is a side view of the case and computer of FIG. 2 with typing stand in various stages of deployment.
FIG. 9 is a bottom view of the carry case fully closed.
Figure 10:
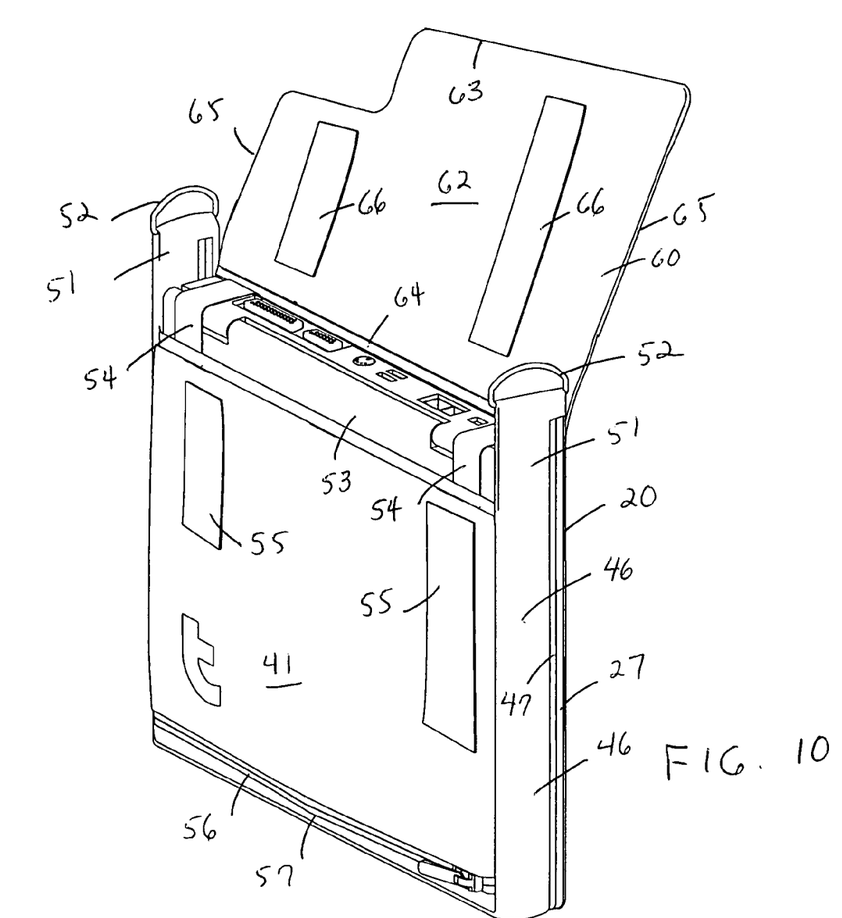
FIG. 10 is a top view with rear flap section opened.

The base section bottom surface 22 has a fold up typing stand 70 attached thereto. The typing stand 70 is comprised three identical, elongated, flat, stiffened elements, a free element 71, an attached element 72, and a middle element 73, said elements having longitudinal axes parallel to the base section rear edge 24. The attached element 72 is joined along one elongated side to the base section bottom surface 22 near to said base section rear edge 24. The attachment element unattached elongated side is joined to one elongated side of the middle element 73. The other elongated side of the middle element is attached to a free element elongated side. The free element 71 has a fastener 74 attached to an underside. The base section bottom surface 22 has a fastener strip 32 attached thereto, said fastener strip 32 adapted to releasably join with said free element fastener 74. Before operation, the typing stand 70 is laid flat against the base section bottom surface, with the free element fastener 74 releasably engage with the base section bottom surface fastener strip 32. To make a typing stand 70 the free element 71 is releasably disengaged from the base section bottom surface fastener strip 32. The unattached elongated side of the free element 71 is folded under the middle element 73 and placed in an abutting relationship with the attached element elongated side attached to said base section bottom surface 22. See FIGS. 8 and 9.

The base section 20 and screen section 40 may be constructed with a stiffener such as a thin plastic plate 36, sandwiched between resilient pads 37, such as foam or the like. The sandwich would then be covered with a material, both protective but not abrasive to the computer and user.

Figure 11:
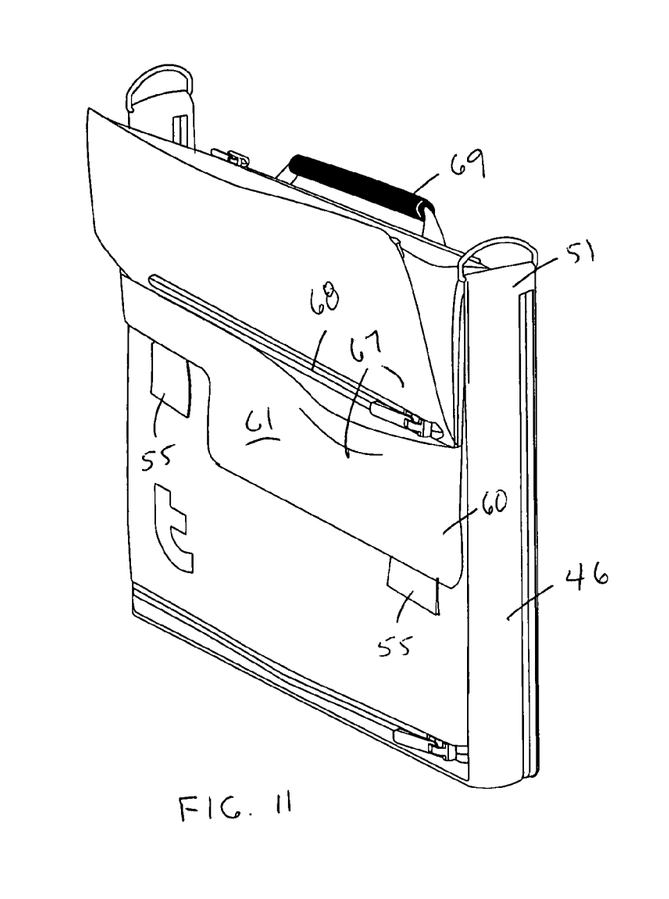
FIG. 11 shows the case of FIG. 10 with rear flap section closed and flap pocket expanded.
Figure 12:
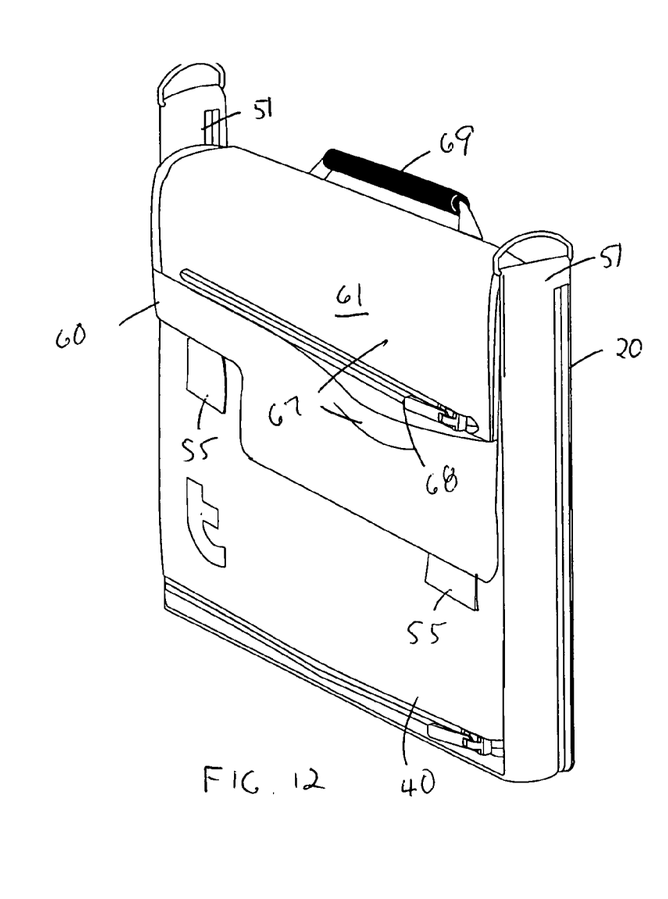
FIG. 12 shows the case of FIG. 11 with flap pocket closed.
Figure 13:
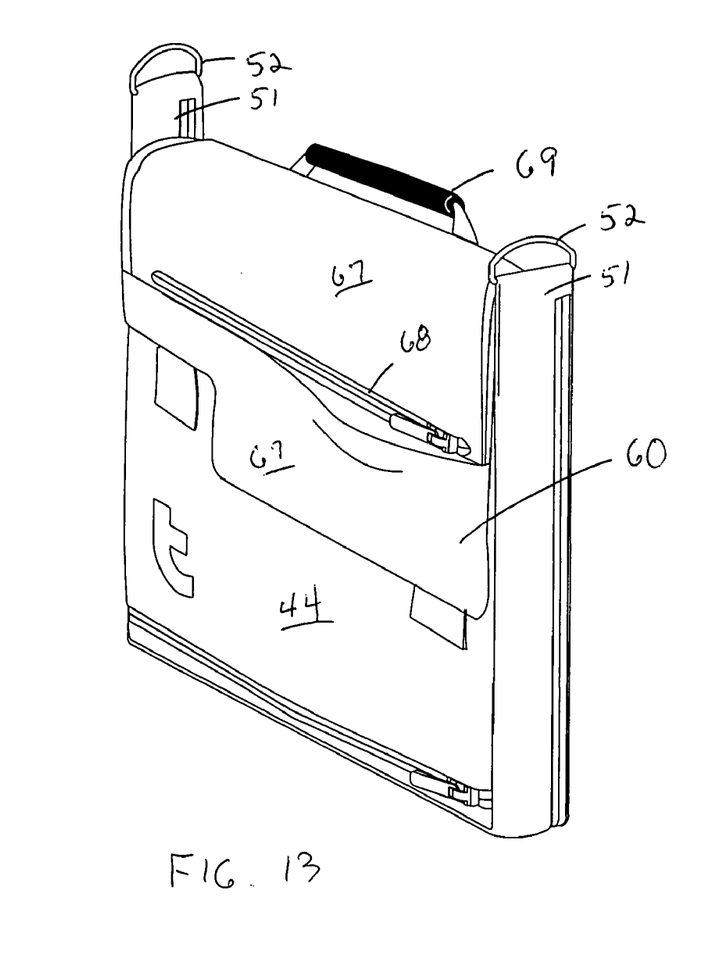
FIG. 13 is a top view of the carry case containing a larger portable computer.
Figure 14:
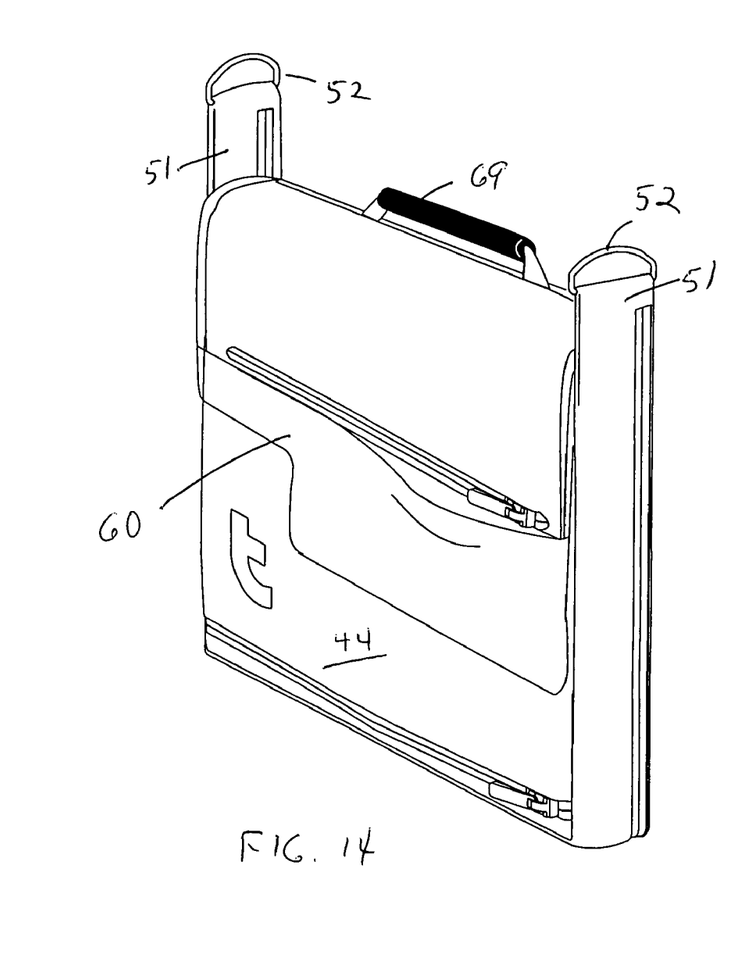
FIG. 14 is a top view of the carry case containing a smaller portable computer.

In operation, the stretchable straps 28, 48 hold the computer 2 in place within the case 1 even after the case is opened. By releasing the flap section 60 from the screen section external surface, the screen section open portion 53 provides full access and ventilation to the computer base portion rear 7. The typing stand 70 may be formed beneath the base section bottom surface 22 as desired by the user. Since the case base section does not have sides, free access and ventilation is available to the computer base portion along all sides. The stretchable straps 28, 48 holding the computer 2 in place within the case 1 are easily adjusted to prevent interference with any connectors or computer media. The adjustment straps 55 provide means for reducing the size of the screen section open portion, as well as provide a snugger fit between screen and base for computers of different sizes. A shoulder strap is available for attachment to the D-rings 52. A handle 69 may be attached to the flap section external surface at the attached end 64, thereby providing the user with another way to carry or manipulate the carry case. As may be seen in FIGS. 11 and 12, one of the flap section pockets 67 may have extra space material folded up within a fastener which, when released, provides extra space.

It is understood that the above-described embodiment is merely illustrative of the application. Other embodiments may be readily devised by those skilled in the art which will embody the principles of the invention and fall within the spirit and scope thereof.

We claim:

1. A carry case for a portable computer having a generally rectangular base portion and a generally rectangular screen portion, said base portion having a top with a keyboard and a plurality of function keys, an opposite flat bottom, a front, a rear with a plurality of connectors and input/output jacks, and two opposite sides with a plurality of media slots and connectors, said screen portion having a front with a display area, a rear, a top edge, a bottom edge and two opposite sides, comprising:

a generally flat base section with a generally rectangular shape, said base section having a top surface, an opposite bottom surface, a front edge, a rear edge and two opposite side edges, said base section front, rear and side edges forming a base section periphery, said base section periphery having a fastener attached thereto along the front and side edges, said base section top surface having two sets of stretchable straps anchored to two parallel strips, a forward anchor strip adjacent the base section front edge and a rearward anchor strip a predetermined distance toward the base section rear edge, said base section top surface being adapted to receive a computer base portion bottom, with the computer base portion having the same orientation on the case base section top surface, said base section straps being fitted over the computer base portion top, from base portion front to base portion sides;

a generally flat screen section with a generally rectangular shape and joined to said base section, said screen section having an external surface, an opposite interior surface, a front, a rear and two opposite sides, said screen section front, rear and sides having a screen section periphery, said screen section front and opposite sides having a flange formed therein, said flange projecting away from the interior surface in planes perpendicular to an interior surface plane, said flange terminating in a fastener adapted to engage the base section fastener, said screen section interior surface having two sets of stretchable straps anchored to two parallel strips attached to the screen section interior surface, a forward anchor strip adjacent the screen section front and a rearward anchor strip a predetermined distance toward the screen section rear, said screen section interior surface being adapted to receive a computer screen portion rear, with the computer screen portion having the same orientation with the case screen section, said screen section straps being fitted over the computer screen front, from screen portion top edge to screen portion sides;

a flap section joined to said base section rear edge, said flap section having an exterior surface, an opposite interior surface, a free end, an attached end and two opposite sides, said flap section attached end being joined to said base section rear edge, said flap section interior surface having two elongated attachment strips attached thereto, said attachment strips having longitudinal axes parallel to the flap opposite sides, wherein the screen section external surface has two corresponding elongated attachment strips attached thereto, said screen section attachment strips and flap section attachment strips adapted to being releasably joined.

2. A carry case as recited in claim 1, further comprising:

a screen section flange extension portion at the rear of each screen section opposite side, said base section and screen section being fixedly attached to each other at the rear edge of the base side edges and rear of the screen sides at the flange extension portion.

3. A carry case as recited in claim 2, wherein:

each flange extension portion terminates in a D-ring.

4. A carry case as recited in claim 3, wherein:

the screen section has a generally rectangular open portion formed at its rear and extending from side to side.

5. A carry case as recited in claim 4, further comprising:

two adjustment straps attached to the screen section adjacent the open portion, said straps being parallel to the screen section sides;

two buckles attached to said base section top surface near to the base section rear edge;

wherein said screen section adjustment straps are adapted to engage said base section buckles.

6. A carry case as recited in claim 5, further comprising:

a fold up typing stand attached to said base section bottom surface comprising three identical, elongated, flat, stiffened elements, a free element, an attached element, and a middle element, each said element having two, opposite elongated sides, said elements having longitudinal axes parallel to the base section rear edge, said attached element being joined along one elongated side to the base section bottom surface near to said base section rear edge, said attached element having an unattached elongated side joined to one elongated side of the middle element, the other elongated side of the middle element being attached to said free element elongated side, said free element having a fastener attached to a free element underside, said base section bottom surface having a fastener strip attached thereto, said fastener strip adapted to releasably join with said free element fastener, wherein said typing stand is adapted to being laid flat against the base section bottom surface, with the free element fastener releasably engaged with the base section bottom surface fastener strip, wherein said typing stand free element is adapted to be releasably disengaged from the base section bottom surface fastener strip and an unattached elongated side of the free element being folded under the middle element and placed in an abutting relationship with the attached element elongated side attached to said base section bottom surface.

7. A carry case as recited in claim 6, wherein:

the base section and screen section are constructed with a stiffener sandwiched between resilient pads, said sandwiched stiffener and pads being covered with a resilient, non-abrasive material.

8. A carry case as recited in claim 7, further comprising:

a shoulder strap adapted for attachment to said D-rings.

9. A carry case as recited in claim 8, further comprising:

a handle attached to the flap section external surface at the attached end.

10. A carry case as recited in claim 9, wherein:

a pocket with an opening formed in the screen section external surface adjacent to the screen section front, and a fastener attached to said opening.

11. A carry case as recited in claim 10, wherein:

said base section fastener and said screen section flange fastener terminate in the flange extension portions.

12. A carry case as recited in claim 11, further comprising:

a plurality of pockets with closure fasteners in said flap section external surface.

13. A carry case as recited in claim 12, wherein:

one of said flap section external surface pockets has extra space material folded up within a fastener, said extra space material adapted, upon release of said fastener, to provide additional space in said pocket.

* * * * *